(12) United States Patent
Pillsbury, IV et al.

(10) Patent No.: US 6,495,799 B1
(45) Date of Patent: Dec. 17, 2002

(54) STEERING WHEEL WITH SELF-REGULATING HEATING ELEMENT

(75) Inventors: Charles S. Pillsbury, IV, Rochester, MI (US); George E. Lancaster, Washington, MI (US); Attila K. Dalkilic, Haibach (DE)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/966,001

(22) Filed: Sep. 28, 2001

(51) Int. Cl.[7] .................................................. B60L 1/02
(52) U.S. Cl. ....................................................... 219/204
(58) Field of Search ................................. 219/204, 494, 219/497; 74/552

(56) References Cited

U.S. PATENT DOCUMENTS

| | | | |
|---|---|---|---|
| 4,857,711 A | | 8/1989 | Watts |
| 4,931,627 A | | 6/1990 | Watts |
| 5,111,025 A | | 5/1992 | Barma et al. |
| 5,372,379 A | * | 12/1994 | Parker .......................... 165/41 |
| 6,084,217 A | | 7/2000 | Bulgajewski |
| 6,093,908 A | * | 7/2000 | Haag .......................... 219/204 |
| 6,299,466 B1 | * | 10/2001 | Bolen et al. ................. 439/164 |

FOREIGN PATENT DOCUMENTS

DE  438134 A  * 10/2000  ........... B62D/00/00

* cited by examiner

Primary Examiner—Teresa Walberg
Assistant Examiner—Vinod D. Patel
(74) Attorney, Agent, or Firm—Tarolli, Sundheim, Covell, Tummino & Szabo L.L.P.

(57) ABSTRACT

A vehicle steering wheel (10) comprises a central hub portion (22), a rim portion (24), and at least one spoke (26) that connects the hub portion (22) to the rim portion (26). The steering wheel (10) further comprises a self-regulating electric heating element (12).

11 Claims, 3 Drawing Sheets

US 6,495,799 B1

STEERING WHEEL WITH SELF-REGULATING HEATING ELEMENT

TECHNICAL FIELD

The present invention relates to a vehicle steering wheel. More particularly, the present invention relates to a vehicle steering wheel including a self-regulating electric heating element.

BACKGROUND OF THE INVENTION

Known steering wheel heating elements include a wire that is either woven into a felt cloth or glued between two felt cloths. When electric current flows through the wire, heat is produced. The wire is connected to a controller that is located in the hub portion of the steering wheel. The controller controls the electric current applied to the wire and, thus, the heat produced by the heating element.

The known steering wheel heating element is tightly wrapped with a leather or leather-like material that forms an outer covering of the steering wheel. The tightly wrapped outer covering compresses the felt material of the known heating element. As a result, the wire of the known heating element can indent the outer covering of the steering wheel and be visible and felt through the outer covering of the steering wheel.

SUMMARY OF THE INVENTION

The present invention is a vehicle steering wheel. The steering wheel comprises a central hub portion, a rim portion, and at least one spoke that connects the hub portion to the rim portion. The steering wheel further comprises a self-regulating electric heating element.

A further aspect of the present invention is that the self-regulating heating element includes a cloth substrate that is coated with a positive temperature coefficient (PTC) conductive material. The electrical resistance of the PTC material changes proportionally to the temperature of the PTC material. The heat produced by the heating element decreases as the electrical resistance of the PTC material increases.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
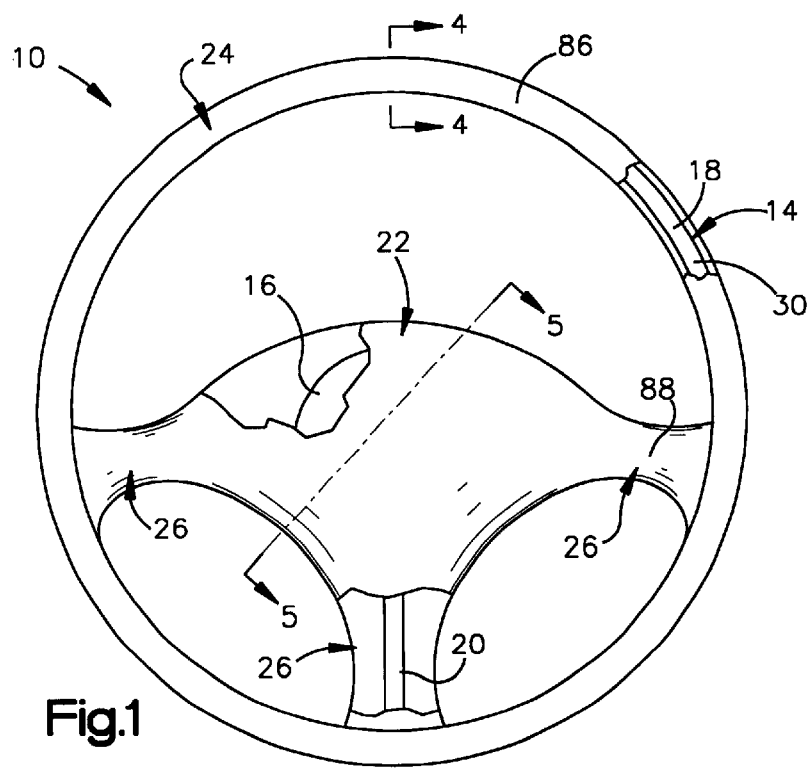
FIG. 1 is a schematic plan view of a vehicle steering wheel constructed in accordance with the present invention.

The present invention is directed to a vehicle steering wheel 10. FIG. 1 is a plan view of a steering wheel 10 constructed in accordance with the present invention. The steering wheel 10 includes a self-regulating electric heating element 12 (FIG. 2), which covers at least part of the steering wheel 10.

The steering wheel 10 includes a steering wheel armature 14. The armature 14 is made of a metallic material, such as aluminum or magnesium. However, the armature 14 could be made of some other suitable material. The armature 14 includes a hub 16, an annular rim 18 that extends circumferentially around the hub 16, and a plurality of spokes 20, one of which is shown, that connect the rim 18 to the hub 16. The hub 16 of the armature 14 is part of a hub portion 22 of the steering wheel 10, and the rim 18 of the armature 14 is part of a rim portion 24 of the steering wheel 10. Each of the spokes 20 of the armature 14 is part of a spoke 26 of the steering wheel 10.

Figure 4:
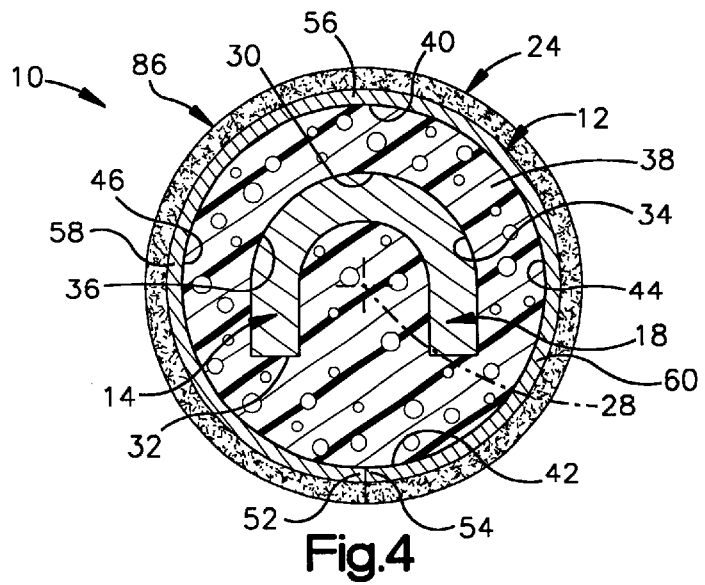
FIG. 4 is a view taken along line 4–4 in FIG. 1.

FIG. 4 shows a cross-sectional view of the rim portion 24 of the steering wheel 10. The cross-section includes a cross-section of the rim 18 of the armature 14. The rim 18 of the armature 14 has a U-shaped cross-section and extends around a circumferentially extending axis 28. A closed end of the U-shaped cross-section forms a front side 30 of the rim 18. The front side 30 of the rim 18 faces toward a vehicle driver. An open end of the U-shaped cross-section forms a rear side 32 of the rim 18. The rear side 32 of the rim 18 faces away from the vehicle driver. The rim 18 also has an inner side 34 and an outer side 36. The inner side 34 of the rim 18 faces radially inwardly toward the hub 16 and the outer side 36 of the rim 18 faces radially outwardly away from the hub 16.

The annular circumference of the rim 18 of the armature 14 is covered with an elastomeric first layer 38. Preferably, the first layer 38 is polyurethane foam. As shown in FIG. 4, the first layer 38 has a circular cross-sectional shape that is also centered on axis 28. The first layer 38 also includes a front side 40, a rear side 42, an inner side 44, and an outer side 46.

A self-regulating heating element 12 covers the first layer 38 on the rim portion 24 of the steering wheel 10. The self-regulating heating element 12, illustrated in FIGS. 2–3, has a generally rectangular shape. A length of the heating element 12, defined as a distance from a first side surface 48 to a second side surface 50, is approximately equal to the circumference of the rim portion 24 of the steering wheel 10. A width of the heating element 12, defined as a distance between an upper side surface 52 and a lower side surface 54, is approximately equal to the circumference of the cross-section of the first layer 38, shown in FIG. 4.

Figure 2:
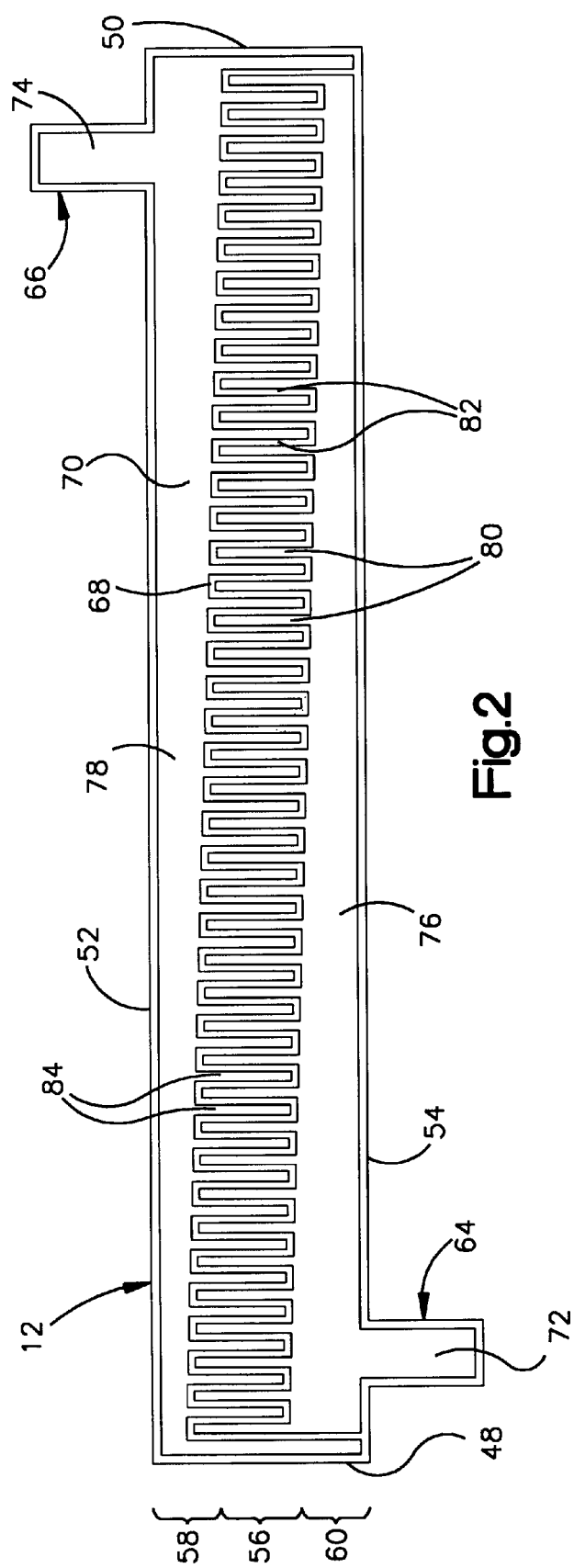
FIG. 2 is a schematic plan view of a heating element for the steering wheel of FIG. 1.

The heating element 12 overlies the first layer 38 on the rim portion 24 of the steering wheel 10 so that a central region, indicated at 56 in FIG. 2, of the width of the heating element 12 overlies the front side 40 of the first layer 38, as shown in FIG. 4. An upper region, indicated at 58, of the width of the heating element 12 overlies the outer side 46 of the first layer 38, and a lower region 60 of the width of the heating element 12 overlies the inner side 44 of the first layer 38. The heating element 12 may be fixed to the first layer 38 of the rim portion 24 of the steering wheel 10 by an adhesive.

When both the upper and lower regions 58 and 60 of the heating element 12 are wrapped around the first layer 38 of the rim portion 24 of the steering wheel 10, the upper side surface 52 of the heating element 12 adjoins or mates with the lower side surface 54 of the heating element 12 on the rear side 42 of the first layer 38, as shown in FIG. 4. To ensure that the rectangular heating element 12 conforms to the annular shape of the rim portion 24 of the steering wheel 10, a plurality of slits (not shown) extends through the central region 56 of the heating element 12. The slits extend in a widthwise direction, i.e., perpendicular to the upper side and lower side surfaces 52 and 54 of the heating element 12. The slits could be eliminated if the heating element 12 wraps readily around the steering wheel 10. When the heating element 12 is wrapped around the first layer 38 of the rim portion 24, the slits open slightly to ensure a complete coverage of the first layer 38 over the entire circumference of the rim portion 24 of the steering wheel 10, except for where the slits are located.

The method by which the heating element 12 is wrapped around the first layer 38 of the rim portion 24 of the steering wheel 10 reduces the length of the heating element 12. For example, if the heating element 12 were to be wrapped around the first layer 38 of the rim portion 24 of the steering wheel 10 in a spiraled manner, i.e., similar to the wrapping of a grip on a tennis racket, the length of the heating element 12 would increase substantially.

Figure 3:
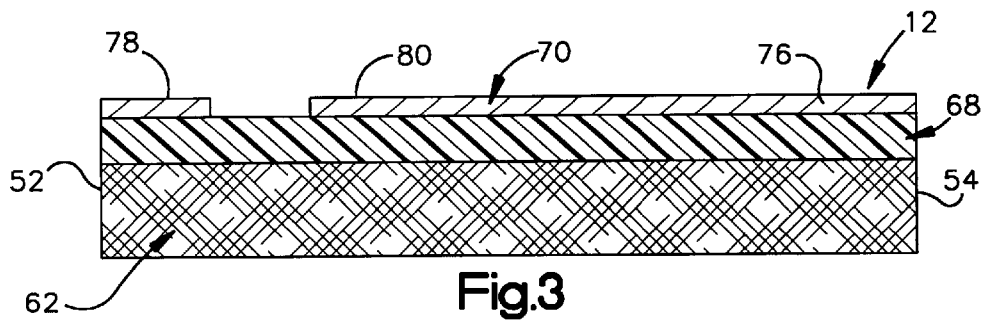
FIG. 3 is a schematic cross-sectional view of the heating element of FIG. 2.

As shown in FIG. 3, the heating element 12 includes a substrate 62 made of cloth, Mylar™, or the like. The substrate 62 is generally rectangular and underlies the entire heating element 12. The substrate 62 also includes first and second protrusions 64 and 66 (FIG. 2) that extend outwardly from opposite corners of the generally rectangular substrate. Electrical terminals are formed on the first and second protrusions 64 and 66.

The substrate 62 of the heating element 12 is coated with a known positive temperature coefficient (PTC) electric current conductive material 68. One example of a PTC material 68 that may be used for the heating element 12 of the present invention is described in U.S. Pat. No. 4,931,627. A PTC material 68 is a material in which the electrical resistance varies in proportion to the temperature of the material. Thus, as the temperature of the PTC material 68 increases, the electrical resistance of the PTC material 68 increases and, as the temperature of the PCT material 68 decreases, the electrical resistance of the PTC material 68 decreases.

Preferably, the PTC material 68 is a screen printable material. The PTC material 68 may be applied in lengthwise extending strips or as a complete coating over the substrate 62. Preferably, the PTC material 68 is applied as a complete coating over the substrate 62.

An electrically conductive material 70, such as silver, is screen printed on top of the PTC material 68 in a pattern designed to distribute heat uniformly over the heating element 12. The pattern, shown in FIG. 2, includes first and second terminals 72 and 74, respectively. The first terminal 72 is located on the first protrusion 64 of the substrate 62. The first terminal 72 extends downward, as viewed in FIG. 2, from the lower side surface 54 of the heating element 12 near the first side surface 48 of the heating element 12. The second terminal 74 is located on the second protrusion 66 of the substrate 62. The second terminal 74 extends upward, as viewed in FIG. 2, from the upper side surface 52 of the heating element 12 near the second side surface 50 of the heating element 12.

The pattern of the electrically conductive material 70 further includes first and second bus bars 76 and 78, respectively. The first bus bar 76 is adjacent to the lower side surface 54 and extends lengthwise across the heating element 12. The first bus bar 76 has a tapered width that narrows as the first bus bar 76 extends from the first side surface 48 toward the second side surface 50.

The second bus bar 78 is adjacent the upper side surface 52 and extends lengthwise across the heating element 12. The second bus bar 78 has a tapered width that narrows as the second bus bar 78 extends from the second side surface 50 toward the first side surface 48.

A first plurality of conductive paths 80 formed of the electrically conductive material 70 extends upwardly from the first bus bar 76. Each conductive path of the first plurality of conductive paths 80 is an elongated member that extends in a direction perpendicular to the lower side surface 54 of the heating element 12. Each conductive path of the first plurality of conductive paths 80 extends widthwise across the heating element 12 a distance of approximately ninety percent of the distance between the first bus bar 76 and the second bus bar 78. A space 82 separates each conductive path of the first plurality of conductive paths 80 from adjacent conductive paths of the first plurality 80. The space 82 extends lengthwise a distance of about two to three times the lengthwise distance of each conductive path of the first plurality of conductive paths 80.

A second plurality of conductive paths 84 formed of the electrically conductive material 70 extends downwardly from the second bus bar 78. Each conductive path of the second plurality of conductive paths 84 is an elongated member that extends in a direction perpendicular to the upper side surface 52 of the heating element 12. Each conductive path of the second plurality of conductive paths 84 extends widthwise across the heating element 12 a distance of approximately ninety percent of the distance between the second bus bar 78 and the first bus bar 76. Each conductive path of the second plurality of conductive paths 84 extends through the center of the space 82 separating adjacent conductive paths of the first plurality of conductive paths 80. Thus, each conductive path of the second plurality of conductive paths 84 extends between adjacent conductive paths of the first plurality of conductive paths 80.

It is important to note that the slits that extend through the central region 56 of the heating element 12 do not extend through the conductive paths 80 or 84 or the bus bars 76 and 78. Instead, the slits extend through a space separating a conductive path of the first plurality of conductive paths 80 from an adjacent conductive path of the second plurality of conductive paths 84.

To operate the heating element 12 of the present invention, a voltage is applied across the terminals 72 and 74 of the heating element 12. When a voltage is applied across the terminals 72 and 74, current flows through the first bus bar 76 and into the first plurality of conductive paths 80. The current then flows through the PTC material 68 to the second plurality of conductive paths 84. Any remaining current flows through the second bus bar 78 to the second terminal 74 of the heating element 12. The current flowing through the PCT material 68 causes the PTC material 68 to produce heat. The amount of current flowing through the PTC material 68 and into the second plurality of conductive paths 84 is inversely proportional to the resistance of the PTC material 68 and to the temperature of the PCT material 68.

The heating effect of the PTC material 68 is a function of power density. Power density is the power per unit area normal to the direction of propagation. Preferably, the pattern of the electrically conductive material 70 is designed so that the power density at any location on the heating element 12 is equal to the power density at any other location on the heating element 12. Thus, the heating element 12 produces uniform heat over its entire area.

As the temperature of the PTC material 68 decreases, the resistance of the PTC material 68 decreases. As a result, more current passes through the PTC material 68. More current results in the heating element 12 producing more heat. As the temperature of the PTC material 68 increases, the resistance of the PTC material 68 increases. As a result, less current passes through the PTC material 68. Less current results in less heat being produced by the heating element 12.

Thus, when the temperature of the heating element 12 is low, the heating element produces heat. A portion of the heat produced by the heating element 12 increases the temperature of the heating element 12 and results in the heating element 12 decreasing the amount of heat produced. Since the resistance of the PTC material 68 increases as temperature increases, at a predetermined temperature, the PTC material 68 will no longer conduct electric current. The predetermined temperature is a function of the PTC material 68 used in forming the heating element 12. When the PTC material 68 no longer conducts electric current, heat is no longer produced by the heating element 12.

For example, assume that the predetermined temperature for the heating element 12 is 75 degrees Fahrenheit and ambient temperature around the steering wheel 10 is 30 degrees Fahrenheit. When electric current is applied to the heating element 12, the heating element 12 will produce heat. A portion of the heat is conducted through the steering wheel 10 and a portion of the heat raises the temperature of the PTC material 68 of the heating element 12. The heating element 12 will continue to produce heat and raise the temperature of the PTC material 68 until the PTC material 68 reaches the predetermined temperature of 75 degrees. When the PTC material 68 reaches 75 degrees, the heating element 12 will no longer produce heat. When the temperature of the PTC material 68 again falls below 75 degrees, the heating element 12 will begin to produce heat and raise the temperature of the PTC material to 75 degrees.

Since the amount of heat produced by the heating element 12 is dependant upon the temperature of the PTC material 68, the heating element 12 is said to be self-regulating. Self-regulating means that the heat produced by the heating element 12 is controlled by properties of the heating element 12 and that no controller is necessary to control the heat produced by the heating element 12.

Preferably, the substrate 62 of the heating element 12 has diagonal ribs that are separated by ninety-degrees. When used to cover the first layer 38 on the rim portion 24 of the steering wheel 10, the ribs of the substrate 62 of the heating element 12 preferably extend at a forty-five degree angle to the surfaces 48, 50, 52, and 54 defining the heating element 12. However, the ribs could extend at some other angle. The forty-five degree angle of the ribs relative to surfaces 48, 50, 52, and 54 of the heating element 12 allows the substrate 62 to be stretched in both a widthwise and a lengthwise direction. The plurality of slits allows additional stretching in the lengthwise direction.

Preferably, when the heating element 12 is applied to the rim portion 24 of the steering wheel 10, the first terminal 72 is located near a spoke 26. Thus, when the heating element 12 covers the entire circumference of the rim portion 24 of the steering wheel 10, the second terminal 74 of the heating element 12 lies adjacent to the same spoke 26. This allows lead wires (not shown) for applying electric energy to the heating element 12 to be extended through the respective spoke 26.

After the heating element 12 is fixed to the rim portion 24 of the steering wheel 10, an outer covering 86 (FIG. 4) is applied over the heating element 12. Preferably, the outer covering 86 is a leather or leather-like material. In addition to a leather or leather-like material, the outer cover 86 may be any other known steering wheel trim material, such as a wood trim. The outer covering 86 may be wrapped or applied over the heating element 12 in any known manner. Since the heating element 12 has a generally uniform thickness, the heating element 12 is not visible through the outer covering 86.

The steering wheel 10, illustrated in FIG. 1, includes three spokes 26. The spokes 26 rigidly connect the rim portion 24 of the steering wheel 10 to the hub portion 22 of the steering wheel 10. The spokes 26 also include an elastomeric first layer (not shown) and an outer covering 88 (FIG. 1). A heating element 12 may be located between the first layer and the outer covering 88 of the spokes 26 to heat the spokes 26 of the steering wheel 10.

The hub portion 22 of the steering wheel 10 is located within the circumference of the rim portion 24 of the steering wheel 10. The hub portion 22 of the steering wheel 10 includes the hub 16 of the armature 14. The hub 16 of the armature 14 includes means (not shown) for rigidly connecting the steering wheel 10 to a steering column (not shown) of the vehicle. The hub 16 may also include a vehicle occupant protection apparatus 90, as illustrated in FIG. 5.

Figure 5:
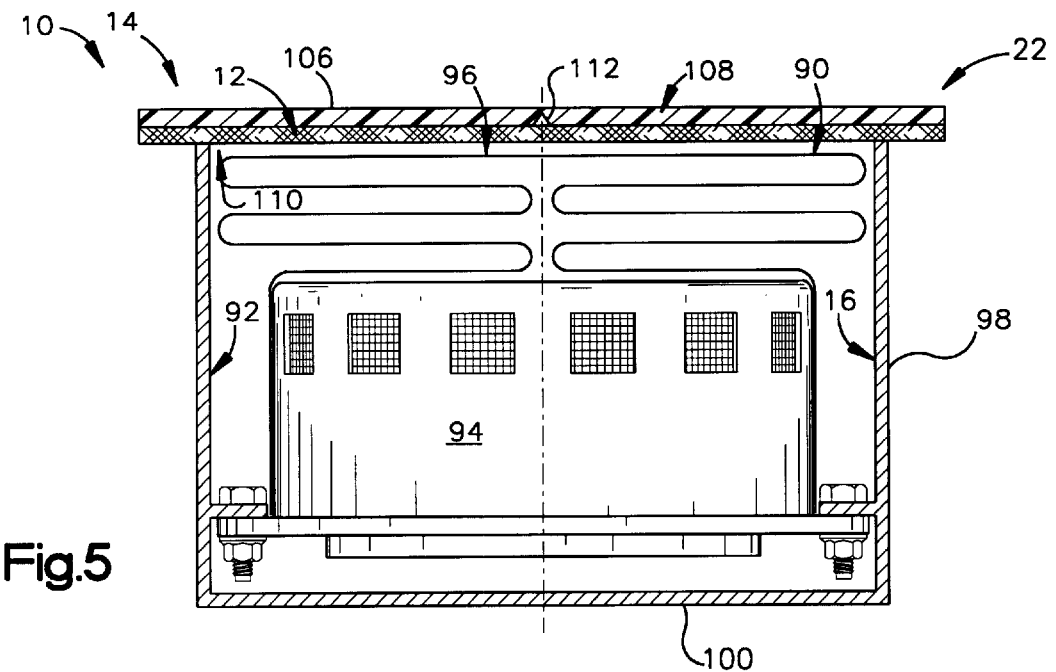
FIG. 5 is a schematic view taken along line 5–5 in FIG. 1.

FIG. 5 is a cross-sectional view of the hub portion 22 of the steering wheel 10 of FIG. 1. Centrally located within the hub portion 22 is a vehicle occupant protection apparatus 90. The illustrated vehicle occupant protection apparatus 90 is an air bag module. The air bag module 90 includes a housing or reaction can 92. The reaction can 92 supports and houses an inflator 94 and an air bag 96, in a deflated condition. In FIG. 5, the hub 16 of the armature 14 forms the reaction can 92 of the air bag module 90. Alternatively, a separate reaction can 92 may be fixed to the hub 16 of the armature 14. When inflation of the air bag 96 of the air bag module 90 is desired, the air bag module 90 operates in a known manner to inflate the air bag 96.

A front surface 106 of the hub portion 22 of the steering wheel 10 includes a deployment door 108 for the air bag module 90. The deployment door 108 encloses the air bag module 90 within the hub portion 22 of the steering wheel 10 and covers an opening 110 through which the air bag 96 inflates. The deployment door 108 includes a tear seam 112 that ruptures when subjected to pressure from an expanding air bag 96.

As shown in FIG. 5, a heating element 12 may be located under the deployment door 108 in the hub portion 22 of the steering wheel 10. When the heating element 12 is located under the deployment door 108, the substrate 62 of the heating element 12 is designed to tear at a predetermined pressure. Thus, when the air bag module 90 is actuated and the air bag 96 begins to expand, the inflating air bag 96 ruptures both the heating element 12 and the deployment door 108 when exiting the hub portion 22 of the steering wheel 10. Alternatively, two separate heating elements 12 may be used in the hub portion 22, one located on either side of the tear seam 112 of the deployment door 108.

The heating element 12 located under the deployment door 108 may be used for two purposes. First, the heating element 12 may be used to heat the hub portion 22 of the steering wheel 10 for comfort of the driver of the vehicle. Second, the heating element 12 may be used to maintain the temperature of the air bag module 90 near a constant temperature. Since the performance of an air bag module 90 may vary as the temperature of the air bag module 90 varies, the heating element 12 may be designed to maintain the temperature of the air bag module 90 at or near a preferred temperature.

Figure 6:
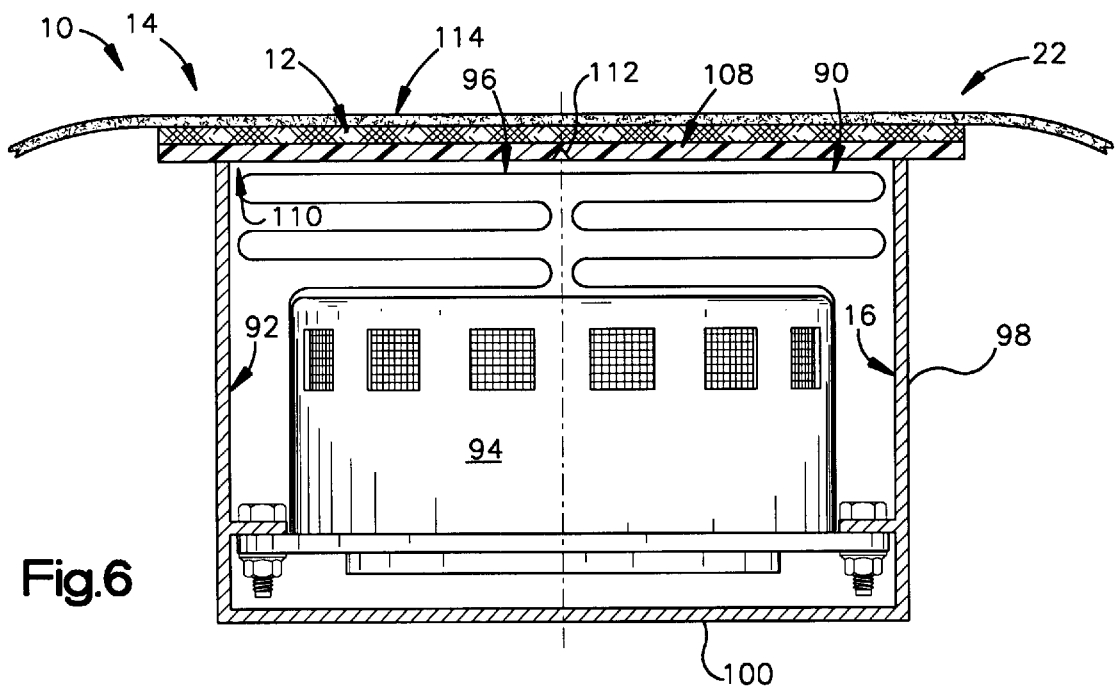
FIG. 6 is a schematic view of a second arrangement of the heating element on a hub portion of the steering wheel.

FIG. 6 is a schematic view of a second arrangement of the heating element 12 on a hub portion 22 of the steering wheel 10. Structures in FIG. 6 that are the same as, or similar to, structures of FIG. 5 will be referred to using the same reference numeral.

The hub portion 22 of the steering wheel 10 of FIG. 6 also includes a deployment door 108 through which the air bag 96 inflates. The deployment door 108 includes a tear seam 112 that ruptures when subjected to pressure from an expanding air bag 96. The heating element 12 is located above the deployment door 108. An outer covering 114 is located above the heating element 12. The outer covering 114 may be leather or leather-like material. The heating element 12 of FIG. 6 may be used to heat the hub portion 22 of the steering wheel 10 for the comfort of the driver. The heating element 12 may also be used to maintain the temperature of the air bag module 90 near a constant temperature.

From the above description of the invention, those skilled in the art will perceive improvements, changes and modifications. For example, the heating element 12 could be attached to the leather or leather-like covering, and thus, the covering and the heating element are wrapped around the steering wheel 10 together. Further, as stated above, the heating element 12 could be applied to any or all of the spokes of the steering wheel 10. Such improvements, changes and modifications within the skill of the art are intended to be covered by the appended claims.

Having described the invention, we claim the following:

1. A vehicle steering wheel comprising:
   a central hub portion, a rim portion, and at least one spoke portion connecting the hub portion to the rim portion; and
   a self-regulating electric heating element mounted on at least one of said portions, said heating element being heated by electric current flowing through material of the element, said material of the heating element increasing its resistance to electric current flow as its temperature increases to terminate heating of the heating element at a predetermined temperature and independent of a separate electrical current controller.

2. The vehicle steering wheel of claim 1 further being defined by:
   the heating element comprising a substrate, a positive temperature coefficient material being applied to the substrate, and an electrically conductive material being applied to a portion of the positive temperature coefficient material.

3. The vehicle steering wheel of claim 2 further being defined by:
   the substrate including diagonal ribs, the ribs of the substrate being oriented relative to surfaces of the heating element to allow stretching of the substrate to conform to a part of the steering wheel.

4. The vehicle steering wheel of claim 3 further being defined by:
   the heating element covering a rim of the steering wheel armature when mounted on the rim portion.

5. The vehicle steering wheel of claim 4 further being defined by:
   the ribs of the substrate extending at an angle of approximately forty-five degrees relative to an upper side surface and a lower side surface of the heating element.

6. The vehicle steering wheel of claim 2 further being defined by:
   an air bag module located in the hub portion of the steering wheel;
   a deployment door covering the air bag module; and
   the heating element being for heating the air bag module when mounted on the hub portion.

7. The vehicle steering wheel of claim 6 further being defined by:
   the heating element being located between the air bag module and the deployment door.

8. The vehicle steering wheel of claim 6 further being defined by:
   the heating element maintaining a temperature of the air bag module at or near the predetermined temperature.

9. The vehicle steering wheel of claim 6 further being defined by:
   an outer covering being applied to the hub portion of the steering wheel, the heating element being interposed between the outer covering and the deployment door.

10. The vehicle steering wheel of claim 9 further being defined by:
    the heating element maintaining a temperature of the air bag module at or near the predetermined temperature.

11. The vehicle steering wheel of claim 2 further being defined by:
    the heating element covering a rim of a steering wheel armature when mounted on the rim portion; and
    an outer covering being applied over the heating element;
    the heating element not being visible or feelable through the outer covering.

* * * * *